United States Patent [19]

Matschke

[11] Patent Number: 5,433,764
[45] Date of Patent: Jul. 18, 1995

[54] DISPOSABLE FILTER ASSEMBLY

[76] Inventor: Arthur L. Matschke, P.O. Box 1007, Southport, Conn. 06490

[21] Appl. No.: 157,838

[22] Filed: Nov. 23, 1993

[51] Int. Cl.⁶ .................................................. B01D 46/10
[52] U.S. Cl. ........................................................... 55/511
[58] Field of Search ............................ 55/487, 490, 511

[56] References Cited

U.S. PATENT DOCUMENTS

| | | |
|---|---|---|
| 2,142,064 | 12/1938 | Whipple . |
| 2,557,279 | 6/1957 | Greenberg . |
| 3,122,197 | 2/1964 | Saponara et al. ................ 55/511 |
| 3,127,259 | 3/1964 | Boylan ............................. 55/511 |
| 3,458,130 | 7/1969 | Juhlin ............................... 55/511 |
| 3,831,759 | 8/1974 | Gelman et al. .................. 55/490 |
| 3,912,473 | 10/1975 | Wilkins ............................ 55/511 |
| 4,410,341 | 10/1983 | Edwards et al. . |
| 4,426,214 | 1/1984 | Vandrish .......................... 55/511 |
| 4,468,321 | 8/1984 | St. John .......................... 55/490 |
| 5,227,074 | 7/1993 | Nichols et al. .................. 55/504 |

*Primary Examiner*—Tim Miles
*Attorney, Agent, or Firm*—Steven H. Bazerman

[57] ABSTRACT

A filter consisting of a conventional filter medium mounted between retaining layers of a porous fabric cut to fit the shape of the opening in the mechanism in which it is to be mounted. A tab extends from one edge of the filter. Around the outer periphery of one of the retaining layers is a layer of adhesive which is, in turn, covered by a protective layer of paper, cardboard or the like. Upon removal of the protective layer, the filter is held in place by the layer of adhesive against its mounting. The protective paper is left on a portion of the tab, thereby, reinforcing the tab and allows it to remain free to manipulate the filter assembly during installation and removal.

4 Claims, 2 Drawing Sheets

DISPOSABLE FILTER ASSEMBLY

BACKGROUND OF THE INVENTION

The present invention relates in general to gas filters and more specifically to a disposable gas filter having an integral adhesive seal.

Gas filters, such as air filters, are normally mounted in an apparatus which draws or pushes the gas through the filter member. Eventually the filter member becomes clogged with the particular filtrate it is designed to capture and must be replaced. Accordingly, it is important to have a filter assembly which is easily positioned and removed, and assures secure positioning within the device in which it is mounted. Filters have been developed made out of a thin layer of relatively fragile filter material which may have cover layers of porous cover material. For such filters it is important that the mounting means takes into account both its non-rigid nature and its relatively delicate construction. Over the years, numerous systems have been developed for the mounting of gas filters, however, none have been developed which fully meet these needs.

For example, U.S. Pat. No. 4,426,214 to Vandrish, issued Jan. 17, 1984, describes a filter for use in a device for detecting particulate contaminants. This filter consists of a filter medium sandwiched between two pieces of plastic material having holes exposing the filter medium to the gaseous medium. The edges of plastic may be bonded to each other and the filter medium by a layer of adhesive. There is no method disclosed for the filter assembly to form a seal with the apparatus.

U.S. Pat. No. 2,557,279 to Greenberg, issued Jun. 19, 1951, describes vacuum cleaner filters. The filter consists of a bulky filter pad positioned in a shaping ring and a cover. The cover has two fabric disks permanently secured together along their edges for at least half of their diameter. The remaining other half of the diameter is connected by a slide fastener means. The filter assembly does not form a seal with its apparatus.

The patent to Whipple, U.S. Pat. No. 2,142,064, issued May 29, 1937, shows a filter assembly for use in a respirator. It similarly involves the use of an external frame means to hold a disc pad filter in place, subjecting the filter to damage and tears in assembling. Filter replacement requires the setting of the filter between various flanges and holding means.

U.S. Pat. No. 3,912,473 of Wilkins, issued Oct. 14, 1975, describes a vent filter. The filter is in the form of a bulky rigid pad. It is mounted in a circular housing. The filter pad is loosely placed within the housing. There is no method to assure a seal of the filter to the apparatus.

U.S. Pat. No. 4,410,341 of Edwards, et al., issued on Oct. 18, 1983, describes a fluid filter cartridge. The filter consists of a pair of annular sheets of filter media that are sandwiched between a pair of mating halves and are separated by a ring member to engage each sheet of filter material against a respective one of the confronting halves.

U.S. Pat. No. 5,227,074 of Nichols et al., issued Jul. 13, 1993 discloses a filter for medical instrument sterilization containers. The filter material is positioned on a peripheral frame that is adapted to cooperate with an entry port. Several cross members span the aperture and form a frame on which the filter medium is positioned. There is no means for sealing the filter medium to the apparatus.

SUMMARY OF THE INVENTION

The present invention provides a filter assembly that substantially eliminates the disadvantages stated above. Filters in accordance with the present invention can consist of conventional filter medium such as Minnesota Mining and Manufacturing's Filtrete ® brand filter medium, mounted between retaining layers or webs of a porous fabric on each side of the filter medium to hold the filter medium in position. The combination of these layers and the filter medium may be cut to fit the shape of the opening in the mechanism in which it is to be mounted. This may, for example, be circular. In accordance with the present invention, a tab extends from one edge. Around the outer periphery of one of the retaining layers there is positioned a layer of adhesive which is, in turn, covered by a protective layer of paper, cardboard or the like. Prior to removal of this protective layer, it acts to stiffen the filter for ease of storage and handling. Upon removal of the protective layer, the filter can be placed with the layer of adhesive against its mounting. This holds the filter in place without the need for complicated mechanical sealing means. The protective paper is left on a portion of the tab. The covering on the end of the tab both reinforces the tab and allows it to remain free to manipulate the filter assembly during installation and removal. Such filter assembly may be used in many applications, including bioconditioning germicidal dryers, allergy control products, inhalation systems and nonmedical applications like vacuum cleaners, fluid filters, and the like.

The improved filter of the present invention is an inexpensive disposable filter which is easily mountable and removable.

Other objects and advantages of this invention will become more readily apparent from the following detailed description of several preferred embodiments thereof when taken in conjunction with the accompanying drawings.

DESCRIPTION OF THE PREFERRED EMBODIMENTS

Figure 1:
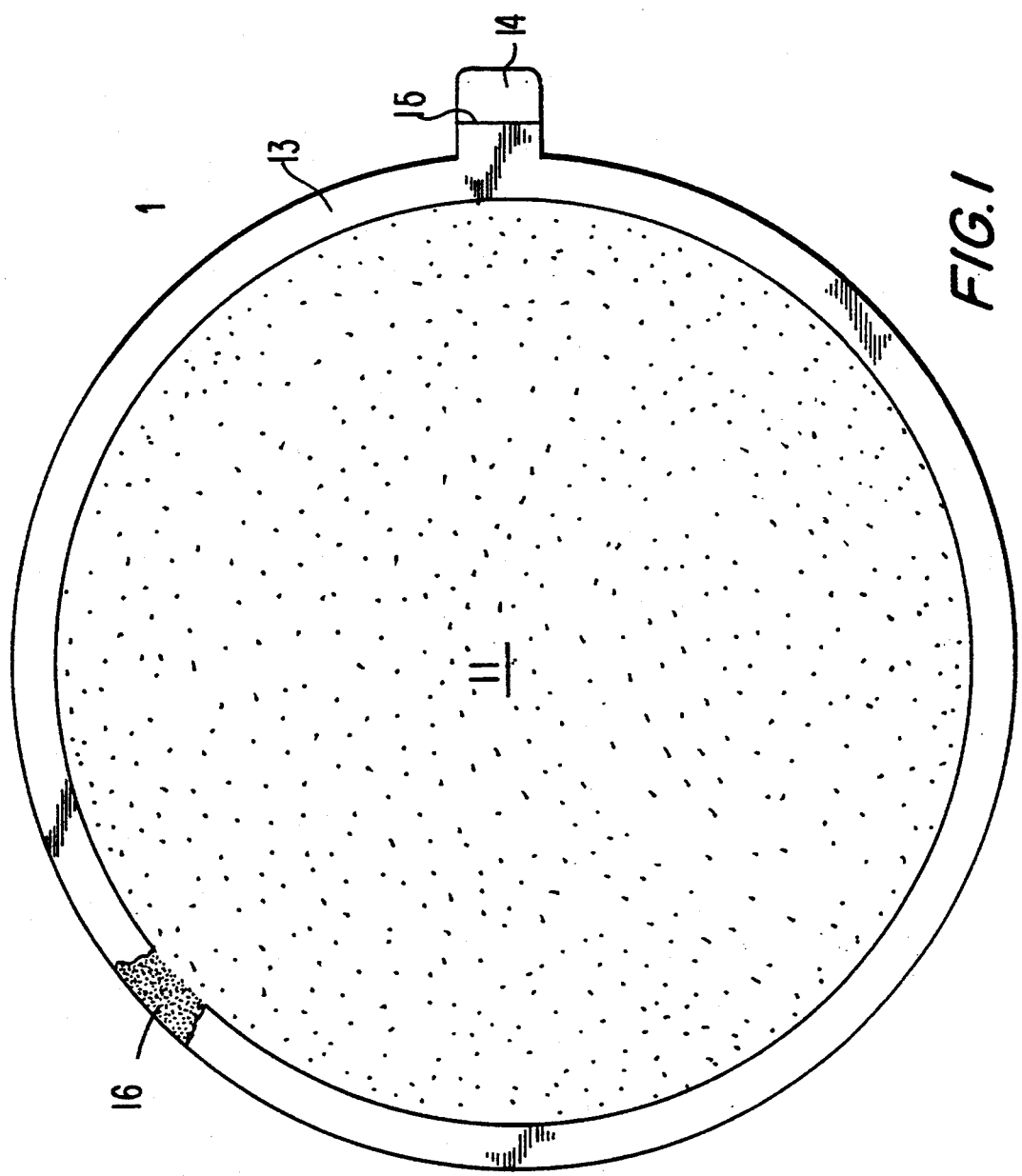
FIG. 1 is a front view of the filter assembly of the present invention with a section of the protective layer cut away.
Figure 2:
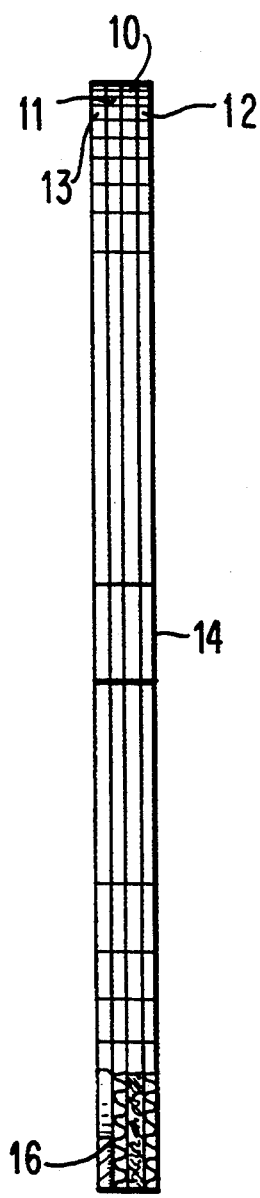
FIG. 2 is a side view of the filter assembly of the present invention having a portion cut away to form a partial sectional view.

Referring to FIGS. 1 and 2, a filter assembly of the present invention 1 is shown. As can be seen in FIG. 2, the filter assembly is formed from a number of individual layers. A conventional filter medium 10 forms the core of the filter assembly. It can be any conventional filter material. The selection of the filter medium would, of course, depend on the filter's intended use. Layers 11 and 12 of a suitable porous cover material are secured to filter medium 10 to hold the filter material in place while allowing passage of the gas to be filtered. A layer of adhesive 16 is positioned around the outer edge of the retaining layer 11. A removable protective layer 13 formed from paper, cardboard or the like treated so as to only lightly adhere to the adhesive layer is positioned over the adhesive to form a thin removable ring around the outer edge of the filter assembly. A tab 14 is formed in the filter medium 10, its retaining layers 11, 12 and the protective layer 13. The adhesive extends over the tab 14. The protective layer 13 extends over the adhesive on tab 14 and has a cut 15 across tab 14. In mounting the filter, the release paper 13 is removed from around retaining layer 11 up to cut 15 and the filter is sealed on and to an apparatus by means of the adhesive. Since the release paper 13 is not removed from cut 15 to the end of the tab 14, tab 14 thus remains covered. The tab 14 is thus free to aid in placement and removal of the filter assembly.

One or more additional rings of material corresponding in shape to release paper 13 may be added to the cover 12 or between retaining layer 11 and the adhesive to stiffen the filter and tab.

The dimensions of the assembly, and the composition of the filter member, adhesive, protective layer or retaining layers may be varied as desired, depending on the intended application.

It is seen by those skilled in the art that the shape and size of the filter assembly and its respective elements can be modified to fit the requirements of the particular device wherein the filter is used.

While the above description includes particular embodiments of the invention for purposes of illustration it will be understood that many changes and variations of the disclosed embodiments of the invention may be made without departing from the inventive concept, it is not intended to limit the invention otherwise than as required by the appended claims.

What is claimed is:

1. A filter comprising a filter member having a layer of adhesive around the outer edge of a side of the filter member and a layer of protective material which is treated to only lightly adhere to said adhesive having a tab which extends from one edge of the filter member, said protective layer being cut so as to allow the protective layer to remain on the tab when the protective layer is removed from the rest of the filter member.

2. A filter as claimed in claim 1 wherein the filter member is substantially circular shaped.

3. The filter as claimed in claim 1 where the filter member consists of a layer of filter material and surrounding layers of porous cover material.

4. A filter as claimed in claim 3 wherein a stiffening ring is placed around the outer edge of one of the layers of porous cover material.

* * * * *